(12) United States Patent
Weber et al.

(10) Patent No.: US 7,876,072 B2
(45) Date of Patent: Jan. 25, 2011

(54) INDUSTRIAL TRUCK WITH A CHARGER

(75) Inventors: Christoph Weber, Henstedt-Ulzburg (DE); Frank Manken, Henstedt-Ulzburg (DE)

(73) Assignee: Jungheinrich Aktiengesellschaft, Hamburg (DE)

(*) Notice: Subject to any disclaimer, the term of this patent is extended or adjusted under 35 U.S.C. 154(b) by 672 days.

(21) Appl. No.: 11/680,300

(22) Filed: Feb. 28, 2007

(65) Prior Publication Data

US 2009/0080228 A1      Mar. 26, 2009

(30) Foreign Application Priority Data

Mar. 1, 2006      (DE) .................. 10 2006 009 312

(51) Int. Cl.
*H02J 7/00*      (2006.01)
*H02J 3/00*      (2006.01)

(52) U.S. Cl. .................. 320/137; 320/104; 363/34

(58) Field of Classification Search .......... 320/104, 320/123, 137; 307/10.7; 363/34, 17, 98, 363/132

See application file for complete search history.

(56) References Cited

U.S. PATENT DOCUMENTS

| | | | |
|---|---|---|---|
| 5,341,075 A | 8/1994 | Cocconi | ............... 318/139 |
| 5,952,812 A | 9/1999 | Maeda | ............... 318/803 |
| 6,160,374 A | 12/2000 | Hayes et al. | |
| 6,297,616 B1* | 10/2001 | Kubo et al. | ............... 320/116 |
| 6,574,125 B2* | 6/2003 | Matsukawa et al. | ........... 363/71 |
| 7,102,898 B2* | 9/2006 | Brkovic | ............... 363/19 |
| 2005/0024901 A1 | 2/2005 | Ying et al. | ............... 363/24 |

FOREIGN PATENT DOCUMENTS

| | | |
|---|---|---|
| EP | 0 593 472 B1 | 7/1991 |
| EP | 0 553 824 A1 | 1/1993 |
| EP | 0 715 389 A1 | 1/1995 |
| EP | 0 849 112 A1 | 12/1997 |
| EP | 1 350 664 A2 | 3/2003 |
| JP | 2000-354331 | 5/2000 |
| WO | 00/54387 | 9/2000 |

OTHER PUBLICATIONS

Japanese Abstract for Publication No. 08-088908, published Apr. 2, 1996, "Charger for Electric Railcar".
Japanese Abstract for Publication No. 08214413 A, published Aug. 20, 1996 for "Charging Apparatus for Automobile".

* cited by examiner

*Primary Examiner*—Edward Tso
*Assistant Examiner*—Richard V Muralidar
(74) *Attorney, Agent, or Firm*—Vidas, Arrett & Steinkraus

(57) ABSTRACT

Industrial truck with a charger, an asynchronous machine and a three-phase AC control unit which converts a DC voltage of a battery for the asynchronous machine, the charger having a switching power supply which is connected to the three-phase AC control unit via a transformer, the switching power supply, the three-phase AC control unit and the transformer forming a resonant converter, which converts a mains voltage into a charging voltage for the battery.

8 Claims, 3 Drawing Sheets

INDUSTRIAL TRUCK WITH A CHARGER

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to an industrial truck with a charger, an asynchronous machine and a three-phase AC control unit, which converts a DC voltage of a battery for the asynchronous machine.

An industrial truck with a charging function is known from EP 1 350 664 A2, the entire contents of which is incorporated herein by reference, in which no separate charger is provided for recharging the battery, but an electronic control device which also controls the charging function. To this end, a separate voltage transformer with an AC/DC transformer is provided, which converts an applied mains voltage to the low voltage of the battery, the AC/DC transformer corresponding to a complete charger without a control board.

A three-phase AC drive arrangement is known from EP 0 849 112 A1, the entire contents of which is incorporated herein by reference, with a battery-supplied, rotational speed variable three-phase machine and a controlled pulse width modulation inverter which generates three-phase AC voltage for the three-phase machine. Furthermore, a charging device is provided for the drive battery, which is supplied by a three-phase network which charges the drive battery. This arrangement requires a motor of complicated design.

An on-board charger is known from EP 0 593 472 B1, the entire contents of which is incorporated herein by reference, in which two bridge arms of an inverter are controlled as step-up converters in order to apply a DC voltage to a capacitor and the further bridge arm of the inverter is controlled as a step-down converter in order to create a charging current for the traction battery from the capacitor.

JP 08 088 908 A, the entire contents of which is incorporated herein by reference, discloses a charger for an electrical railcar, in which secondary-side rectification is carried out in series by additional diode half-bridges.

A charger is known from JP 08 214 413 A, the entire contents of which is incorporated herein by reference, in which a power contactor is provided for switching between the three-phase AC control unit and the charger.

A combined motor drive and battery recharging system is known from U.S. Pat. No. 5,341,075, the entire contents of which is incorporated herein by reference, in which the applied mains voltage is not converted by a transformer but merely filtered.

The object of the invention is to provide an industrial truck with a charges for the traction battery which makes it possible to recharge the traction battery reliably and by simple means.

BRIEF SUMMARY OF THE INVENTION

The industrial truck according to the invention has a charger, an asynchronous machine and a three-phase AC control unit which converts a DC voltage of a battery for the asynchronous machine. In the embodiment according to the invention, a switching power supply is provided for the charger which is connected to the three-phase AC control unit via a transformer. The switching power supply, the three-phase AC control unit and the transformer form a resonant converter, preferably a series resonant converter, which converts a mains voltage into a charging voltage for the battery. In the resonant converter provided according to the invention, power-free switching is carried out compared to, for example, a forward converter. This offers a series of advantages, thus for example the EMC emitted interference is reduced. Moreover, currentless or voltageless switching leads to markedly reduced switching losses, whereby for example the components are prevented from heating up too much. By means of the low heat generation, encapsulation is possible which produces insulation according to IP54. The charger is preferably a built-in unit which is connected to the vehicle body and the electrical connections.

The fundamental principle of the resonant converter is that the resonant inductor(s) and/or resonant capacitor(s) provided as a whole, form a resonant circuit which allows the transistors to be switched in the zero crossings of the current or the voltage.

In a preferred embodiment, a capacitor is provided on the secondary side in the resonant converter, preferably provided in series with the transformer. In a preferred embodiment, an inductor of the resonant converter is also provided on the primary side in series with the transformer.

In a preferred embodiment, the resonant converter switches at zero current (zero current switch converter) or at zero voltage (zero voltage switch converter).

BRIEF DESCRIPTION OF THE SEVERAL VIEWS OF THE DRAWINGS

An embodiment is described in more detail with reference to the figures in which.

DETAILED DESCRIPTION OF THE INVENTION

Figure 2:
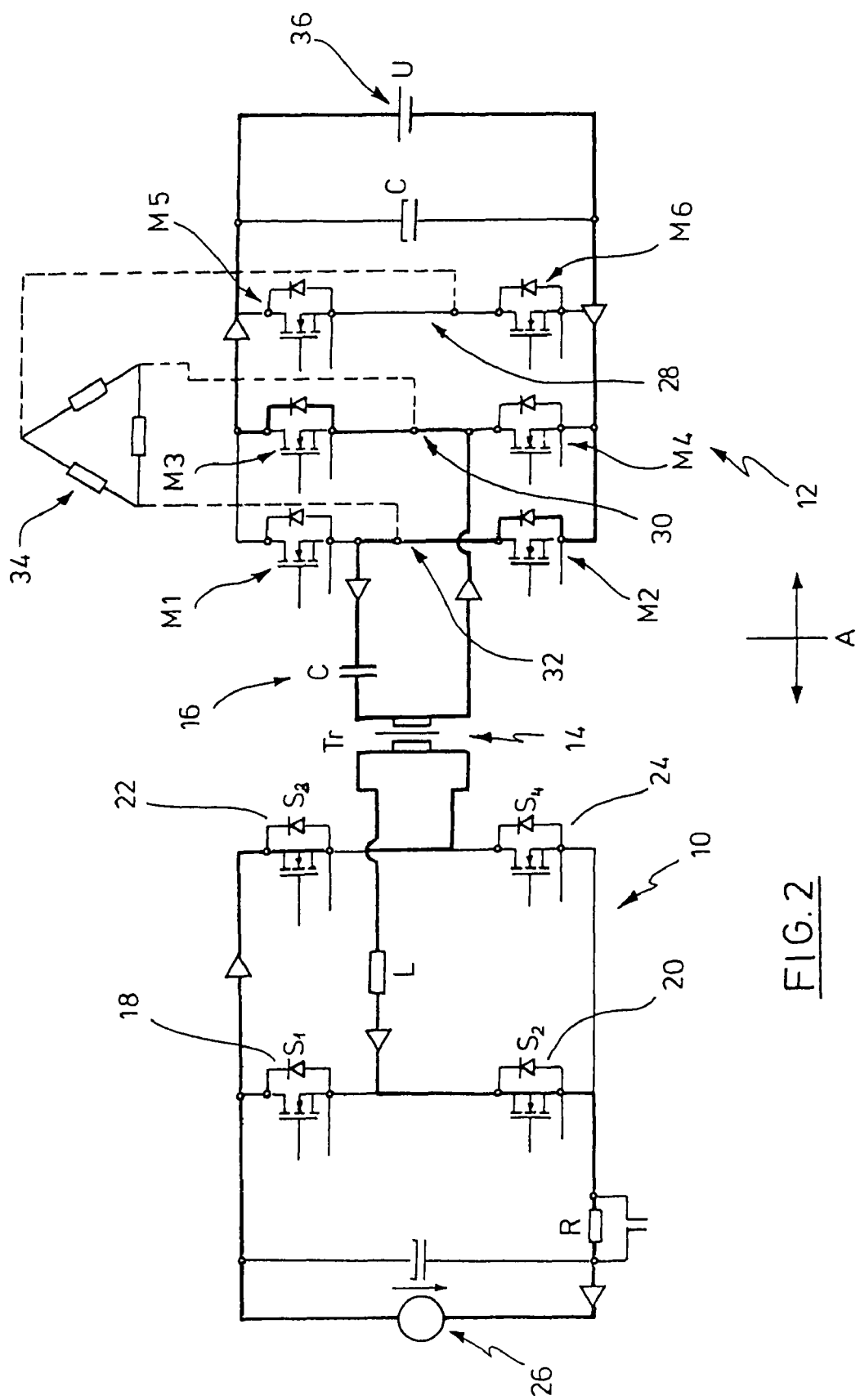
FIGS. 2 and 3 show a resonant converter with a resonant capacitor arranged on the secondary side.

While this invention may be embodied in many different forms, there are described in detail herein a specific preferred embodiment of the invention. This description is an exemplification of the principles of the invention and is not intended to limit the invention to the particular embodiment illustrated FIG. 2 shows the principal construction of a resonant converter. The switching power supply 10 is located to the left of a separating line A. The three-phase AC control unit 12 already present in industrial trucks is located to the right of the separating line A. The switching power supply 10 has a transformer 14 which is connected on the secondary side to a capacitor 16 at an output. Furthermore, converter valves 18, 20, 22, 24 are provided in the switching power supply 4. The converter valves are arranged to form a bridge of which the diagonal terminals are connected to the transformer 14. The mains connection 26 is illustrated for alternating voltage. On the secondary side, the three-phase AC control unit has an inverter with 3 bridge arms 28, 30, 32 which are of identical construction. Each of the bridge arms has two converter valves which are denoted as a whole as M1 to M6. The converter valves are switchable power semiconductors, such as for example MOSFET transistors with a free-wheel diode or insulated gate bipolar transistors (IGBTs) with an internal free-wheel diode.

One respective connection for an asynchronous machine 34 is provided between the converter valves in the individual branches 28, 30 and 32. The control unit for the converter is not shown in FIG. 2. The converter is powered during normal driving operation by a battery 36.

Figure 3:
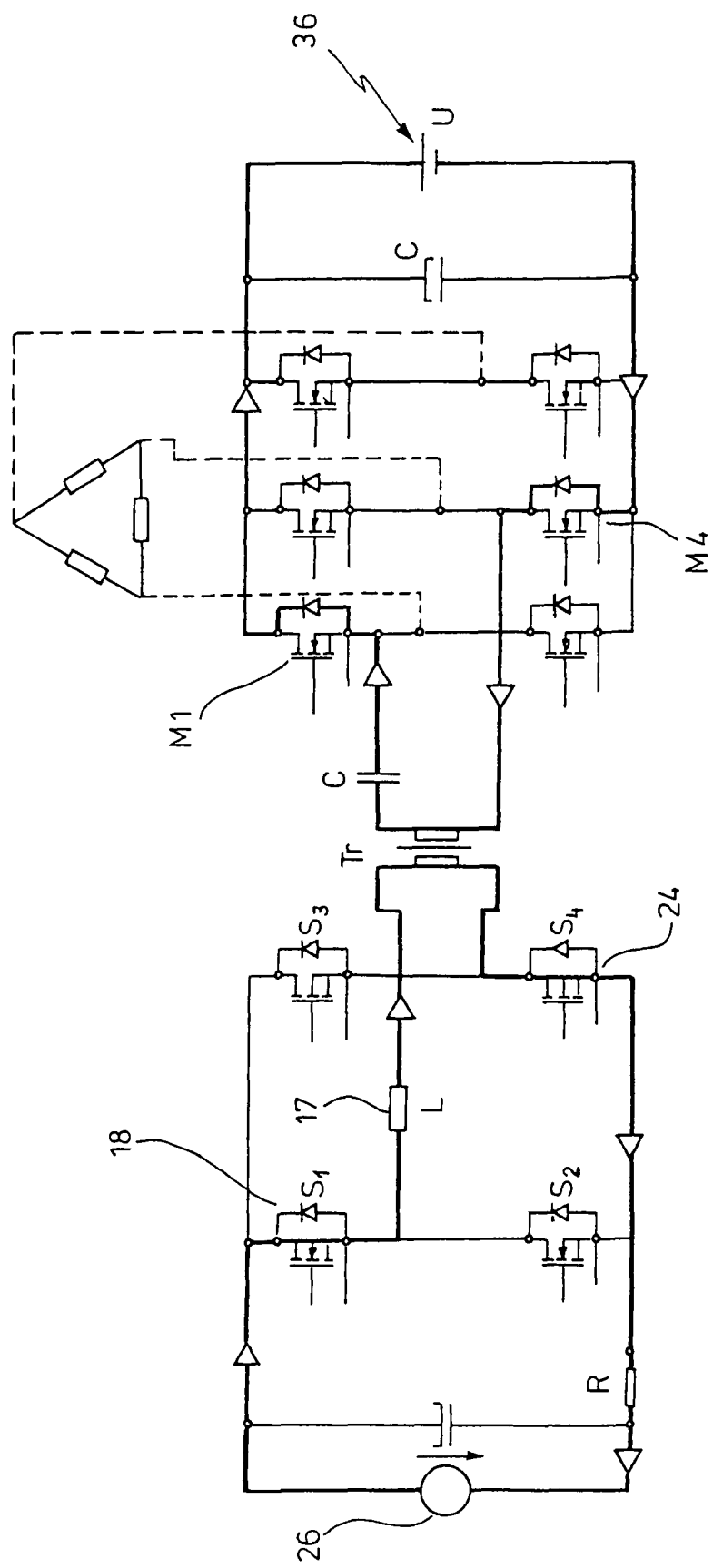

In the switching state shown in FIG. 2, the current in the switching power supply 10 flows via the converter valves 22 and 20. On the secondary side the current flows via the converter valves M2 and M3. In FIG. 3, the same circuit is shown, in which when the direction of current is constant at the power supply, the direction of current on the primary side of the transformer 14 has been altered and the direction of current through the three-phase AC control unit has not been altered. In this state, the current flows on the primary side via the converter valves 18 and 24 and on the secondary side via M1 and M4. It is apparent, therefore, that whilst the direction of current on the primary side has been altered, there are no alterations to the current on the secondary side. The activation of the resonant converter, in particular the control of the switching periods, result in currents of variable output levels, so that it is possible to control the charging current. Alternatively, the charging current may also be controlled by varying the input voltage source 26.

Figure 1:
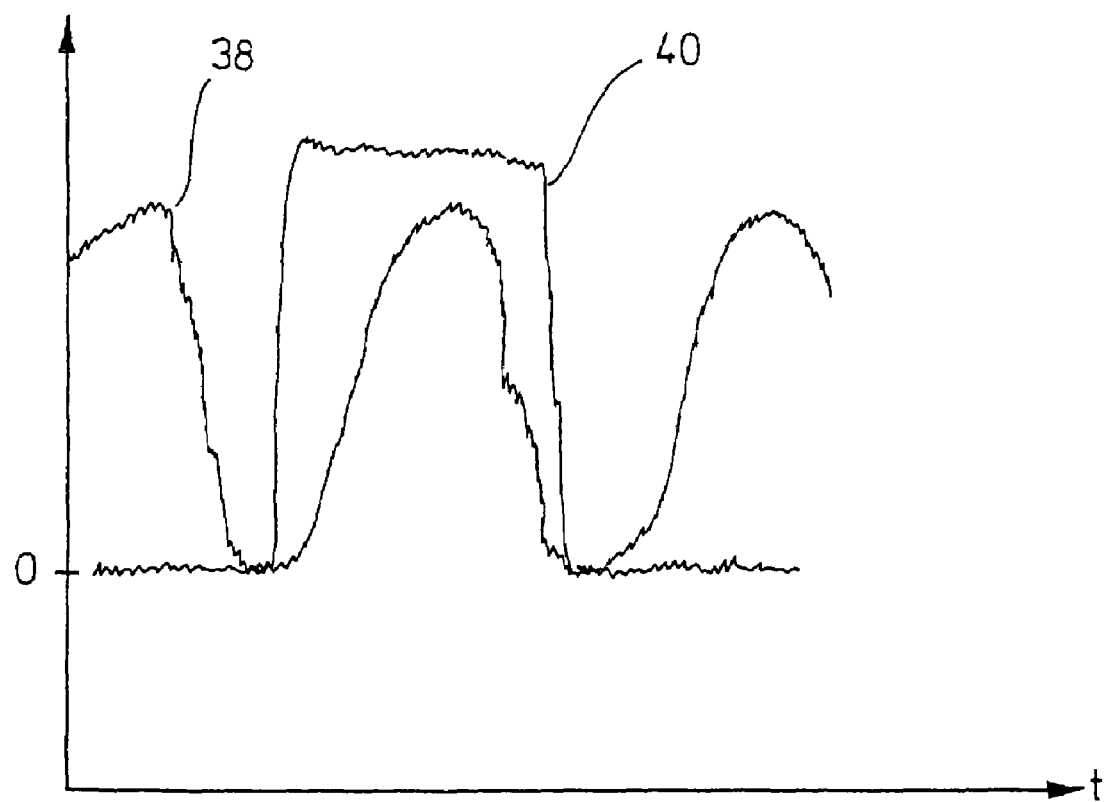
FIG. 1 shows the current path and voltage path on a resonant converter.

FIG. 1 shows, by way of example, the path of the current on the primary side which is switched in the zero crossing and thus on the secondary side produces the DC voltage path 40 shown for one of the converter valves. With charging powers of several 100 Watts, less heat is generated by the use of the resonant converter, even with continuous operation, as well as resulting in good electromagnetic compatibility.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Industrial truck with a charger (10), an asynchronous machine (34) and an existing three-phase AC control unit (12) which converts a DC voltage of a battery (36) for the asynchronous machine (34), characterised in that the charger has a switching power supply (10) which is connected to the existing three-phase AC control unit (12) via a transformer (14), the switching power supply (10), the existing three-phase AC control unit (12) and the transformer (14) forming an integrated resonant converter, which converts a mains voltage into a charging voltage for the battery.

2. Industrial truck according to claim 1, characterised in that the resonant converter is configured as a series resonant converter.

3. Charger according to claim 1, characterised in that the resonant converter has a capacitor on the secondary side.

4. Charger according to claim 2, characterised in that the capacitor (16) is switched in series with the transformer.

5. Industrial truck according to one of claim 1, characterised in that the resonant converter has an inductor (17) on the primary side.

6. Industrial truck according to one of claim 1, characterised in that the resonant circuit is arranged on the secondary side.

7. Industrial truck according to one of claim 1, characterised in that the resonant converter switches at a zero crossing of the current.

8. Industrial truck according to one of claim 1, characterised in that the resonant converter switches at a zero crossing of the voltage.

* * * * *